(12) United States Patent
Sato et al.

(10) Patent No.: US 11,324,034 B2
(45) Date of Patent: May 3, 2022

(54) BASE STATION APPARATUS AND MOBILE STATION APPARATUS

(71) Applicants: SHARP KABUSHIKI KAISHA, Sakai (JP); FG Innovation Company Limited, Tuen Mun (HK)

(72) Inventors: Seiji Sato, Sakai (JP); Jungo Gotoh, Sakai (JP); Osamu Nakamura, Sakai (JP); Shohei Yamada, Sakai (JP); Yasuhiro Hamaguchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 52 days.

(21) Appl. No.: 16/960,786

(22) PCT Filed: Dec. 27, 2018

(86) PCT No.: PCT/JP2018/048239
§ 371 (c)(1),
(2) Date: Jul. 8, 2020

(87) PCT Pub. No.: WO2019/138913
PCT Pub. Date: Jul. 18, 2019

(65) Prior Publication Data
US 2021/0068147 A1 Mar. 4, 2021

(30) Foreign Application Priority Data
Jan. 10, 2018 (JP) .............................. JP2018-001722

(51) Int. Cl.
*H04W 72/14* (2009.01)
*H04W 72/04* (2009.01)

(52) U.S. Cl.
CPC .................................. *H04W 72/14* (2013.01)

(58) Field of Classification Search
None
See application file for complete search history.

(56) References Cited

U.S. PATENT DOCUMENTS

2019/0082451 A1* 3/2019 Yun ......................... H04L 5/001
2020/0169990 A1* 5/2020 Takeda ................ H04W 52/367
2020/0305186 A1* 9/2020 Alfarhan ........... H04W 72/0453

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.3.0 (Jun. 2017).

(Continued)

*Primary Examiner* — Hong S Cho
(74) *Attorney, Agent, or Firm* — ScienBiziP, P.C.

(57) ABSTRACT

In a case that multiple configured uplink grants are configured in a single serving cell, there is a problem that normal communication cannot be performed unless appropriate control is performed to prevent transmissions in a radio resource (slot) of the same timing. A mobile station apparatus in a communication system including at least a base station apparatus and the mobile station apparatus for which the base station apparatus allocates a normal uplink and a supplementary uplink in a single serving cell, wherein the mobile communication apparatus is configured to configure a configured uplink grant individually for each of the normal uplink and the supplementary uplink, and validate, in a case that the serving cell is activated, one of the configured uplink grant configured for the normal uplink and the configured uplink grant configured for the supplementary uplink and suspend another one.

6 Claims, 8 Drawing Sheets

(56) References Cited

OTHER PUBLICATIONS

"3rd Generation Partnership Project; Technical Specification Group Radio Access Network; NR; NR and NG-RAN Overall Description; Stage 2 (Release 15)", 3GPP TS 38.300 V2.0.0 (Dec. 2017).
MCC Support, "Final Report of 3GPP TSG RAN WG1 #90bis v1.0.0, (Prague, Czech Rep, Oct. 9-13, 2017)", R1-1719301, 3GPPTSG RAN WG1 Meeting #91, Reno, USA, Nov. 27-Dec. 1, 2017.

* cited by examiner

BASE STATION APPARATUS AND MOBILE STATION APPARATUS

TECHNICAL FIELD

An aspect of the present invention relates to a base station apparatus and a mobile station apparatus. This application claims priority based on JP 2018-001722 filed on Jan. 10, 2018, the contents of which are incorporated herein by reference.

BACKGROUND ART

The standardization organization, 3rd Generation Partnership Project (3GPP) has standardized specifications for Evolved Universal Terrestrial Radio Access (hereinafter referred to as "EUTRA"), which evolved from the third-generation mobile communication method, and Advanced EUTRA (also referred to as "LTE-Advanced"), which further evolved from EUTRA to serve as a fourth-generation mobile communication method. Further, mobile communications using such specifications are commercialized in countries (NPL 1). In recent years, technical studies and standardization of the fifth generation mobile communication method are underway in 3GPP (NPL 2).

As one of scheduling (communication resource allocating) technologies, there is a method for periodical allocation of communication resources using Semi-Persistent Scheduling (SPS). Unlike dynamic scheduling in which communication resources are allocated using signalling called a grant for each subframe, this is a technology in which communication resources are allocated in accordance with a predetermined configuration (such as a time interval, a modulation scheme, initiation timing, and/or the number of repetitions) to omit a grant, and hence enables efficient communication with reduced overheads caused by control signals. While SPS has been employed also in the existing technologies of LTE and LTE-Advanced and used for real-time communications such as a communication of a voice service, studies and standardization of specifications for further evolution of SPS have progressed also in the fifth-generation mobile communication method. In addition, studies and standardization of specifications of an uplink Grant Free (GF) communication method have progressed that enable, by applying uplink SPS, uplink data transmission from a mobile station apparatus to a base station apparatus without an uplink grant allocated from the base station apparatus to the mobile station apparatus.

Although the use of ultra high frequency carriers is also considered in the fifth-generation mobile communication method, this case has a problem that the coverage area of an uplink is narrower than that of a downlink in a single serving cell. As a countermeasure against this, a technology is also studied in which an uplink carrier of a frequency having a coverage area equivalent to that of a downlink is used simultaneously, to supplementarily cover an area which cannot be covered by a normal uplink. Such an uplink used supplementarily is referred to as a "Supplementary Uplink (SUL)". A normal uplink and a SUL need to be controlled so as not to perform transmissions in a radio resource (slot) of the same timing.

CITATION LIST

Non Patent Literature

NPL 1: "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)" 3GPP TS 36.300 V14.3.0 (2017-06)

NPL 2: "3rd Generation Partnership Project; Technical Specification Group Radio Access Network; NR; NR and NG-RAN Overall Description; Stage 2 (Release 15)" 3GPP TS 38.300 V2.0.0 (2017-12)

SUMMARY OF INVENTION

Technical Problem

In a case that multiple configured uplink grants are configured in a single serving cell, there is a problem that normal communication cannot be performed unless appropriate control is performed to prevent transmissions in a radio resource (slot) of the same timing.

An aspect of the present invention has been made in view of these circumstances, and an object of the present invention is to provide a base station apparatus, a mobile station apparatus, and a communication method that enable communication to be performed normally even in a case that multiple configured uplink grants are configured in a single serving cell.

Solution to Problem (1) A mobile station apparatus according to an aspect of the present invention is a mobile station apparatus in a communication system including at least a base station apparatus and the mobile station apparatus for which the base station apparatus allocates a normal uplink and a supplementary uplink in a single serving cell, wherein the mobile communication apparatus is configured to configure a configured uplink grant individually for each of the normal uplink and the supplementary uplink, and validate, in a case that the serving cell is activated, one of the configured uplink grant configured for the normal uplink and the configured uplink grant configured for the supplementary uplink and suspend another one.

(2) A mobile station apparatus according to an aspect of the present invention is the mobile station apparatus described above, wherein in the case that the serving cell is activated, the mobile station apparatus further validates the configured uplink grant configured for the normal uplink and suspends the configured uplink grant configured for the supplementary uplink.

(3) A mobile station apparatus according to an aspect of the present invention is the mobile station apparatus described above, wherein in the case that the serving cell is activated, the mobile station apparatus further validates the configured uplink grant configured for the supplementary uplink and suspends the configured uplink grant configured for the normal uplink.

(4) A mobile station apparatus according to an aspect of the present invention is the mobile station apparatus described above, wherein the mobile station apparatus further receives, from the base station apparatus, control information including prescribed uplink information specifying either one of the normal uplink and the supplementary uplink as a default uplink and validates, in the case that the serving cell is activated, the configured uplink grant for the prescribed uplink specified by the prescribed uplink information.

(5) A mobile station apparatus according to an aspect of the present invention is the mobile station apparatus described above, wherein the mobile station apparatus further suspends, in a case that the serving cell is deactivated, the configured uplink grant that has been validated and validates, in a case that the serving cell is activated again, the configured uplink grant that has been suspended in a case that the serving cell has been deactivated.

(6) A mobile station apparatus according to an aspect of the present invention is the mobile station apparatus described above, wherein the mobile station apparatus further suspends the configured uplink grant that has been validated and validates the configured uplink grant that has been suspended, based on up uplink switching control information received from the base station apparatus.

(7) A base station apparatus according to an aspect of the present invention is a base station apparatus in a communication system including at least the base station apparatus and a mobile station apparatus for which the base station apparatus allocates a normal uplink and a supplementary uplink in a single serving cell, wherein the base station is configured to transmit, to the mobile station, control information including prescribed uplink information specifying either one of the normal uplink and the supplementary uplink as a default uplink.

Advantageous Effects of Invention

According to the present invention, communication can be performed normally even in a case that multiple configured uplink grants are configured in a single serving cell.

DESCRIPTION OF EMBODIMENTS

First Embodiment

Figure 1:
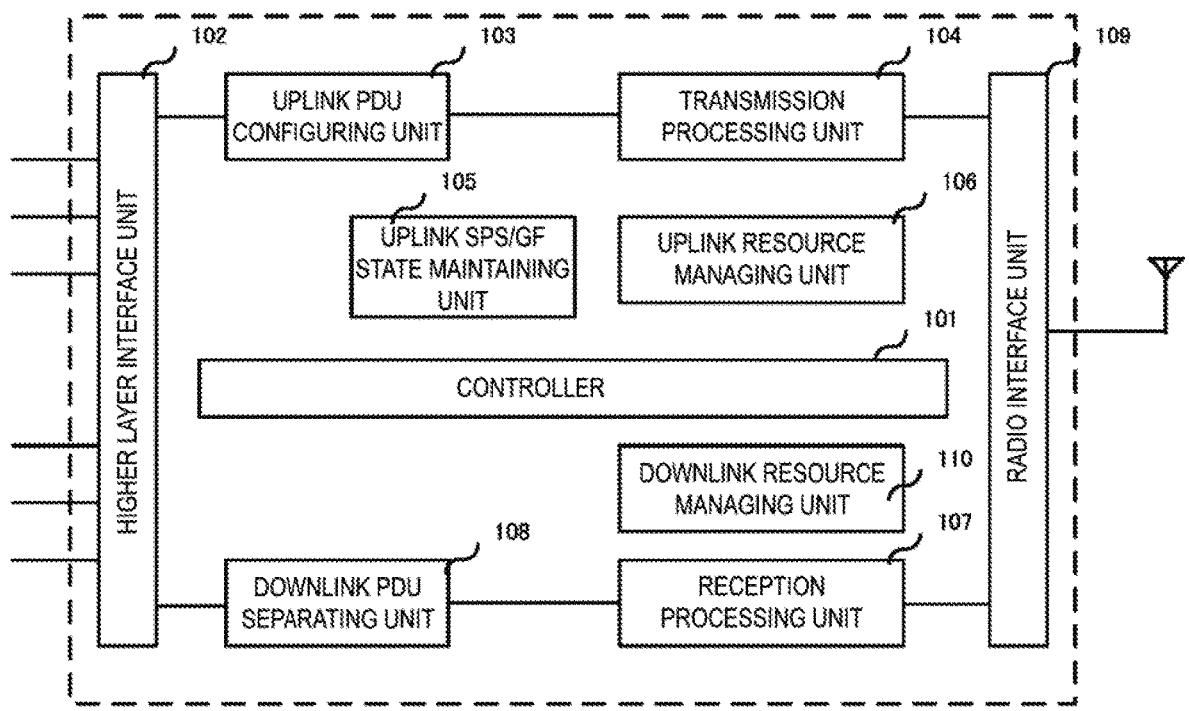
FIG. 1 is a diagram illustrating an example of a MAC entity configuration in a mobile station apparatus according to the present invention.

Hereinafter, a first embodiment of the present invention will be described with reference to the drawings. FIG. 1 illustrates an example of a MAC entity configuration in a mobile station apparatus according to the present embodiment. In FIG. 1, reference sign 101 represents a controller, which controls all the components. Reference sign 102 represents a higher layer interface unit, which configures and manages logical channels with higher layers such as PDCP, RLC, and RRC and transmits and/or receives uplink data and/or downlink data through the logical channels. Reference sign 103 represents an uplink Protocol Data Unit (PDU) configuring unit, which configures an uplink PDU by, for example, adding a header to uplink transmission data from a higher layer received through a logical channel and combining data of multiple logical channels. Reference sign 104 represents a transmission processing unit, which performs error correction coding processing, modulation processing, or the like on the uplink PDU generated by the uplink PDU configuring unit 103 and performs mapping of the uplink PDU to an uplink SPS resource indicated from an uplink resource managing unit 106. Reference sign 105 represents an uplink SPS/GF state managing unit, which manages the states of uplink SPS/GF and changes the states of the uplink SPS/GF in a case that an event relating to the uplink SPS/GF occurs. The uplink resource managing unit 106 manages uplink resources allocated by a base station apparatus and controls mapping between uplink PDUs and transmission resources. In addition, the uplink resource managing unit 106 configures uplink SPS/GF resources and validates/invalidates a configured uplink grant in accordance with the uplink SPS/GF state managed by the uplink SPS/GF state managing unit 105. A reception processing unit 107 reconfigures a downlink PDU by performing demodulation or decoding of an error correction code on a signal received from a radio interface unit 110. A downlink PDU separating unit 108 separates the downlink PDU received from the reception processing unit 107 into one or multiple pieces of data, transmits user data and control data to a higher layer through the higher layer interface unit 102, and transmits Control Element (CE) data to the controller 101. Reference signal 110 represents a downlink resource managing unit, and the radio interface unit 109 transmits and/or receives radio signals to and/or from the base station apparatus.

Figure 2:
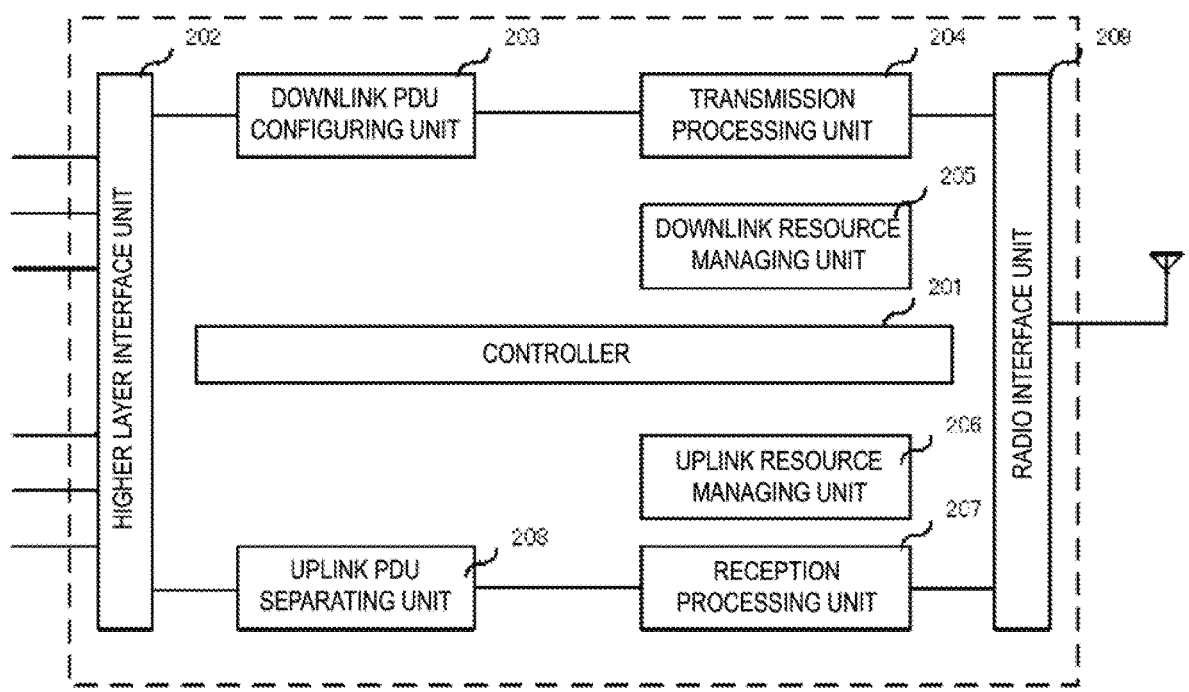
FIG. 2 is a diagram illustrating an example of a MAC entity configuration in a base station apparatus according to the present invention.

FIG. 2 illustrates an example of a MAC entity configuration in a base station apparatus according to the present embodiment. In FIG. 2, reference sign 201 represents a controller, which controls all the components. Reference sign 202 represents a higher layer interface unit, which configures and manages logical channels with higher layers such as PDCP, RLC, and RRC and transmits and/or receives uplink data and/or downlink data through the logical channels. Reference sign 203 represents a downlink PDU configuring unit, which configures a downlink PDU by, for example, adding a header to downlink transmission data from a higher layer received through a logical channel and combining data of multiple logical channels. Reference sign 204 represents a transmission processing unit, which performs error correction coding processing and modulation processing on the downlink PDU generated by the downlink PDU configuring unit 203, performs mapping of the downlink PDU to downlink resources in accordance with a downlink resource managing unit 205 and transmits the resultant downlink PDU to the mobile station apparatus through a radio interface unit 209. Reference sign 205 represents a downlink resource managing unit, which performs management and scheduling of downlink resources allocated to the mobile station apparatus. An uplink resource managing unit 206 configures and manages uplink resources allocated to the mobile station apparatus. A reception processing unit 207 reconfigures an uplink PDU by performing demodulation and decoding of an error correcting code for a signal received from the radio interface unit 210. An uplink PDU separating unit 208 separates the uplink PDU reconfigured by the reception processing unit 207 into one or multiple pieces of data and transmits user data and control data to a higher layer through the higher layer interface unit 202. The radio interface unit 209 transmits and/or receives radio signals to and/or from the mobile station apparatus.

While a grant of dynamic scheduling is referred to as a dynamic grant, a grant of semi-persistent scheduling is referred to as a configured grant because communication resources are allocated in accordance with a predetermined configuration. In standardization of specifications for a fifth-generation mobile communication method in 3GPP, standardization of the specifications is in progress toward SPS and GF in combination being referred to as "Transmission/Reception without dynamic grant", downlink SPS being referred to as "DL-SPS", and GF SPS and uplink SPS being referred to as "configured grant Type 1" and "configured grant Type 2", respectively. Note that in the following description, "configured grant Type 1" is referred to as "GF" for convenience.

Although SPS is allowed to be configured only in a primary cell (PCell) and a primary secondary cell (PSCell) called special cells (SpCells) in LTE and LTE-A, downlink and uplink SPS and GF are also allowed to be configured in a secondary cell (SCell) in specifications of the fifth-generation communication method of 3GPP. The secondary cell is controlled between an active state and an inactive state by a network, and does not perform transmission and/or reception in the inactive state. Activation to cause the secondary cell to be in the active state and deactivation to cause the secondary cell to be in the inactive state are indicated by an SCell Activation/Deactivation MAC Control Element (CE) transmitted from the base station apparatus to the mobile station apparatus. A configured uplink grant of GF configured in the uplink carrier of the secondary cell is suspended in a case that the secondary cell is in the inactive state, to prohibit transmission of uplink data while maintaining the configuration of the configured uplink grant. In a case that the secondary cell is in the active state, the configured uplink grant of GF is also activated to transmit uplink data.

In a case of configuring GF for an UL carrier and a SUL carrier in a serving cell, the configuration is performed by using a Radio Resource Control (RRC) Connection Reconfiguration message (hereinafter, an RRC reconfiguration message) transmitted from the base station apparatus to the mobile station apparatus or GF configuration parameters included in the RRC Reconfiguration message (hereinafter, an RRC reconfiguration message). The GF configuration parameters include all the configurations necessary to configure GF (such as radio resource allocation, periodicity, initiation timing, MCS, and the number of repetitions). The UL carrier and the SUL carrier may have all of or part of the GF configuration parameters in common or may have separate GF configuration parameters. The mobile station apparatus configures a configured uplink grant of GF for each of the UL carrier and the SUL carrier according to the contents of the GF configuration parameters. In a case that the configured uplink grant of GF is in the active state, uplink data can be transmitted. In a case that the configured uplink grant of GF is in the suspended state, uplink data is not transmitted while the configured uplink grant is held.

In a case that a configured uplink grant of GF is configured for both the UL carrier and the SUL carrier, transmissions at the same timing (slot) cannot be performed simultaneously as described above, and hence countermeasures need to be taken. An example of the countermeasures is a method of determining in advance that, of the UL carrier and the SUL carrier, the UL carrier is set as a default, and in a case that a configured uplink grant of GF is configured simultaneously for the UL carrier and the SUL carrier by an RRC reconfiguration message, activating the configured uplink grant of GF for the UL carrier while suspending the configured uplink grant of GF for the SUL carrier. It is conceivable, in a case of suspending the configured uplink grant of GF for the UL carrier and activating the configured uplink grant of GF for the SUL carrier, to perform the switching by transmitting, for example, UL switching signalling from the base station apparatus to the mobile station apparatus. This UL switching signalling may use, for example, downlink layer 1 signalling or may use a MAC CE. The switching may be performed using a higher layer (RRC) message. This UL switching signalling may include information indicating which one of the UL carrier and the SUL carrier is to be activated or which one of the UL carrier and the SUL carrier is to be suspended. Alternatively, toggle switching may be performed to suspend an active configured uplink grant while activating a suspended configured uplink grant in a case of receiving UL switching signalling.

As another example, which one of the (normal) UL carrier and the SUL carrier is to be used as a first active UL carrier may be reported from the base station apparatus to the mobile station apparatus by using an RRC reconfiguration message. Which one of the UL carrier and the SUL carrier is to be set as an active UL carrier in a case that the serving cell (such as the SCell) in which the SUL carrier is configured is activated is reported from the base station apparatus to the mobile station apparatus by using an RRC reconfiguration message. In a case of adding a SpCell by using an RRC reconfiguration message, information related to a carrier to be used in a random access procedure is reported. In the addition of a SpCell, in a case that SUL is configured in the cell and that a carrier to be used for the random access procedure is signaled, the mobile station apparatus selects the carrier signaled as the carrier to be used in the random access procedure. Alternatively, in the addition of a SpCell, in a case that SUL is configured in the cell, that a carrier to be used in the random access procedure is not signaled, and that a reference signal reception power with downlink path loss reference falls below a certain threshold, the mobile station apparatus selects the SUL carrier as the carrier to be used in the random access procedure. Otherwise (in a case that SUL is not configured in the cell or in a case that a carrier to be used in the random access procedure is not signaled, and that a reference signal reception power with downlink path loss reference does not fall below the certain threshold), the mobile station apparatus selects the (normal)

UL carrier as the carrier to be used in the random access procedure. In this case, the mobile station apparatus may set the carrier selected for the random access procedure, as an active UL carrier. In a case that the mobile station apparatus is subsequently indicated to perform carrier switching, the mobile station apparatus deactivates the active carrier and activates the inactive carrier.

The mobile station apparatus makes one of one or multiple of UL BWPs active (activates one of one or multiple UL BWPs) in the active UL carrier and makes all UL BWP(s) inactive (deactivate all UL BWP(s)) in the inactive UL carrier. The mobile station apparatus activates a configured uplink grant of GF in the active UL carrier and suspends a configured uplink grant of GF in the inactive UL carrier. The mobile station apparatus activates the configured uplink grant of GF in the active BWP and suspends the configured uplink grant of GF in the inactive BWPs.

Figure 3:
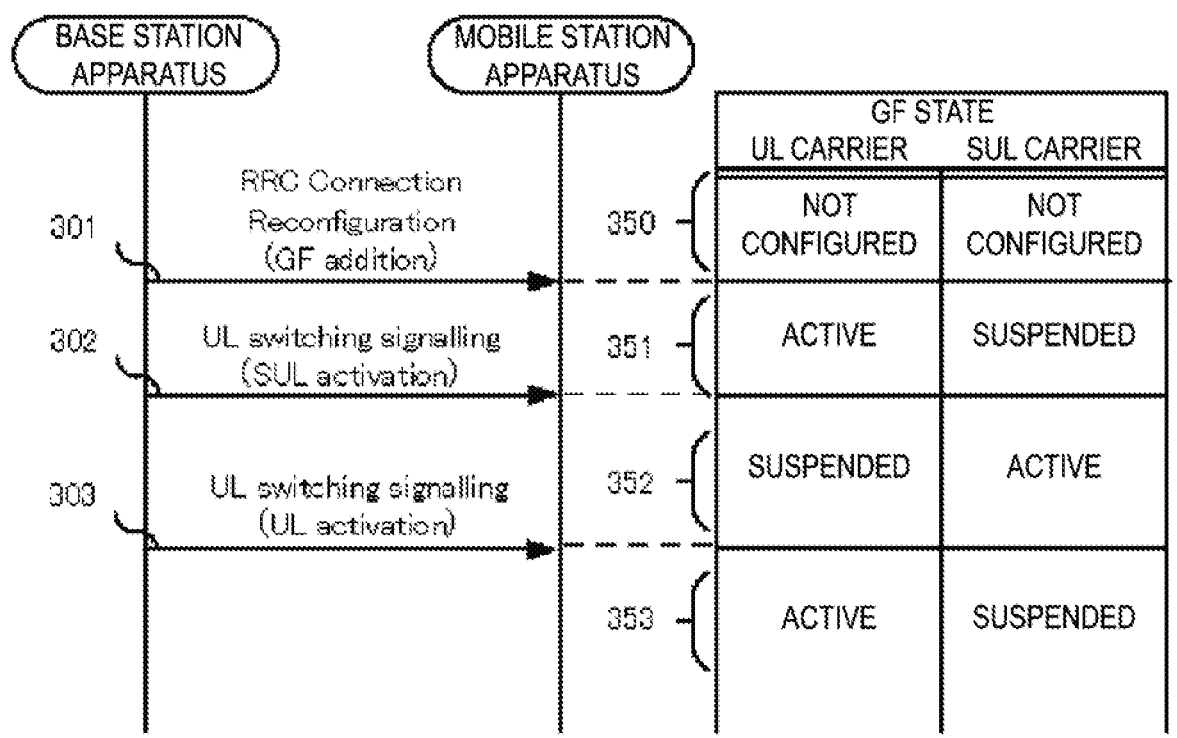
FIG. 3 is a diagram illustrating an example of a flow of messages from the base station apparatus to the mobile station apparatus and states of configured uplink grants of GF for an UL carrier and a SUL carrier at the time of receiving each of the messages, in a case of employing a first embodiment of the present invention.

With reference to FIG. 3, a description will be given of a method of managing, by a MAC entity of the mobile station apparatus, a state of uplink GF configured for each of an UL carrier and a SUL carrier in a serving cell, in a case of employing the present embodiment. FIG. 3 illustrates a flow of messages from the base station apparatus to the mobile station apparatus and states of configured uplink grants of GF for the UL carrier and the SUL carrier in a case of receiving each of the messages. First, in an initial state, both the UL carrier and the SUL carrier are in a state where GF is not configured (350). Next, an RRC reconfiguration message 301 indicating addition of a GF configuration (GF addition) to each of the UL carrier and the SUL carrier is transmitted to the mobile station apparatus. The mobile station apparatus that has received the message 301 configures a configured uplink grant of GF for each of the UL carrier and the SUL carrier, in accordance with the contents of the RRC reconfiguration message 301, and activates the configured uplink grant of GF for the UL carrier set as a default while suspending the configured uplink grant of GF for the SUL carrier (351). Next, UL switching signalling 302 indicating activation of the configured uplink grant of GF for the SUL carrier (SUL activation) is transmitted from the base station apparatus to the mobile station apparatus. The mobile station apparatus that has received the UL switching signalling 302 suspends the configured uplink grant of GF for the UL carrier while activating the configured uplink grant of GF for the SUL carrier (352). Subsequently, UL switching signalling 303 indicating activation of the configured uplink grant of GF for the UL carrier is transmitted from the base station apparatus to the mobile station apparatus. The mobile station apparatus that has received the UL switching signalling 303 activates the configured uplink grant of GF for the UL carrier while suspending the configured uplink grant of GF for the SUL carrier (353).

As described above, a description has been given of a case that a configured uplink grant of GF for a UL carrier is set as a default in the present embodiment, but this similarly applies to a case that a configured uplink grant of GF for a SUL carrier is set as a default.

Second Embodiment

In the first embodiment, a description has been given of a method of determining in advance which one of a configured uplink grant of GF for a UL carrier and a configured uplink grant of GF for a SUL carrier is set as a default. However, another method is also conceivable in which a configured uplink grant configuration of GF including which one of configured uplink grants of GF is to be set as a default is transmitted from the base station apparatus to the mobile station apparatus, and the mobile station apparatus determines which one of the configured uplink grants of GF is to be set as a default, in accordance with the configuration. This will be described as a second embodiment.

Figure 4:
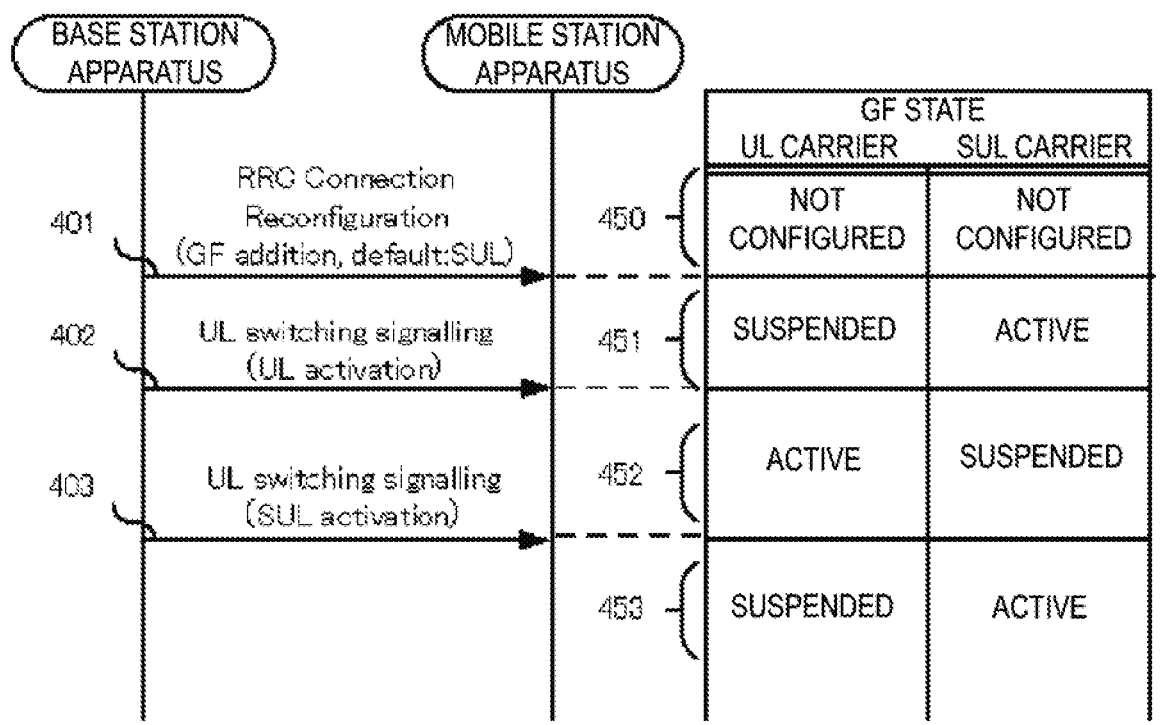
FIG. 4 is a diagram illustrating an example of a flow of messages from the base station apparatus to the mobile station apparatus and states of configured uplink grants of GF for an UL carrier and a SUL carrier at the time of receiving each of the messages, in a case of employing a second embodiment of the present invention.

With reference to FIG. 4, a description will be given of a method of managing, by a MAC entity of the mobile station apparatus, a state of uplink GF configured for each of an UL carrier and a SUL carrier in a serving cell. FIG. 4 illustrates a flow of messages from the base station apparatus to the mobile station apparatus and states of configured uplink grants of GF in an uplink carrier and a supplementary uplink carrier in a case of receiving each of the messages. First, in an initial state, both the UL carrier and the SUL carrier are in a state where GF is not configured (450). Next, an RRC reconfiguration message 401 indicating addition of a GF configuration (GF addition) to each of the UL carrier and the SUL carrier and setting of the configured uplink grant of GF for the SUL carrier as a default is transmitted to the mobile station apparatus. The mobile station apparatus that has received the message 401 configures a configured uplink grant of GF for each of the UL carrier and the SUL carrier, in accordance with the contents of the RRC reconfiguration message 401, and activates the configured uplink grant of GF for the SUL carrier while suspending the configured uplink grant of GF for the UL carrier (451). Next, UL switching signalling 402 indicating activation of the configured uplink grant of GF for the UL carrier is transmitted from the base station apparatus to the mobile station apparatus. The mobile station apparatus that has received the UL switching signalling 402 suspends the configured uplink grant of GF for the SUL carrier while activating the configured uplink grant of GF for the UL carrier (452). Subsequently, UL switching signalling 303 indicating activation of the configured uplink grant of GF for the SUL carrier is transmitted from the base station apparatus to the mobile station apparatus. The mobile station apparatus that has received the UL switching signalling 403 activates the configured uplink grant of GF for the SUL carrier while suspending the configured uplink grant of GF for the UL carrier (453).

As described above, a description has been given of a case that a configuration of setting a configured uplink grant of GF for a SUL carrier as a default is included in an RRC reconfiguration message in the present embodiment, but this similarly applies to a case that a configuration of setting a configured uplink grant of GF for an UL carrier as a default is included in an RRC reconfiguration message.

Third Embodiment

A case of applying the present invention to a GF configuration in an UL carrier and a SUL carrier in a serving cell, such as a secondary cell, that is controlled to be activated or deactivated by a network will be described as a third embodiment.

Figure 5:
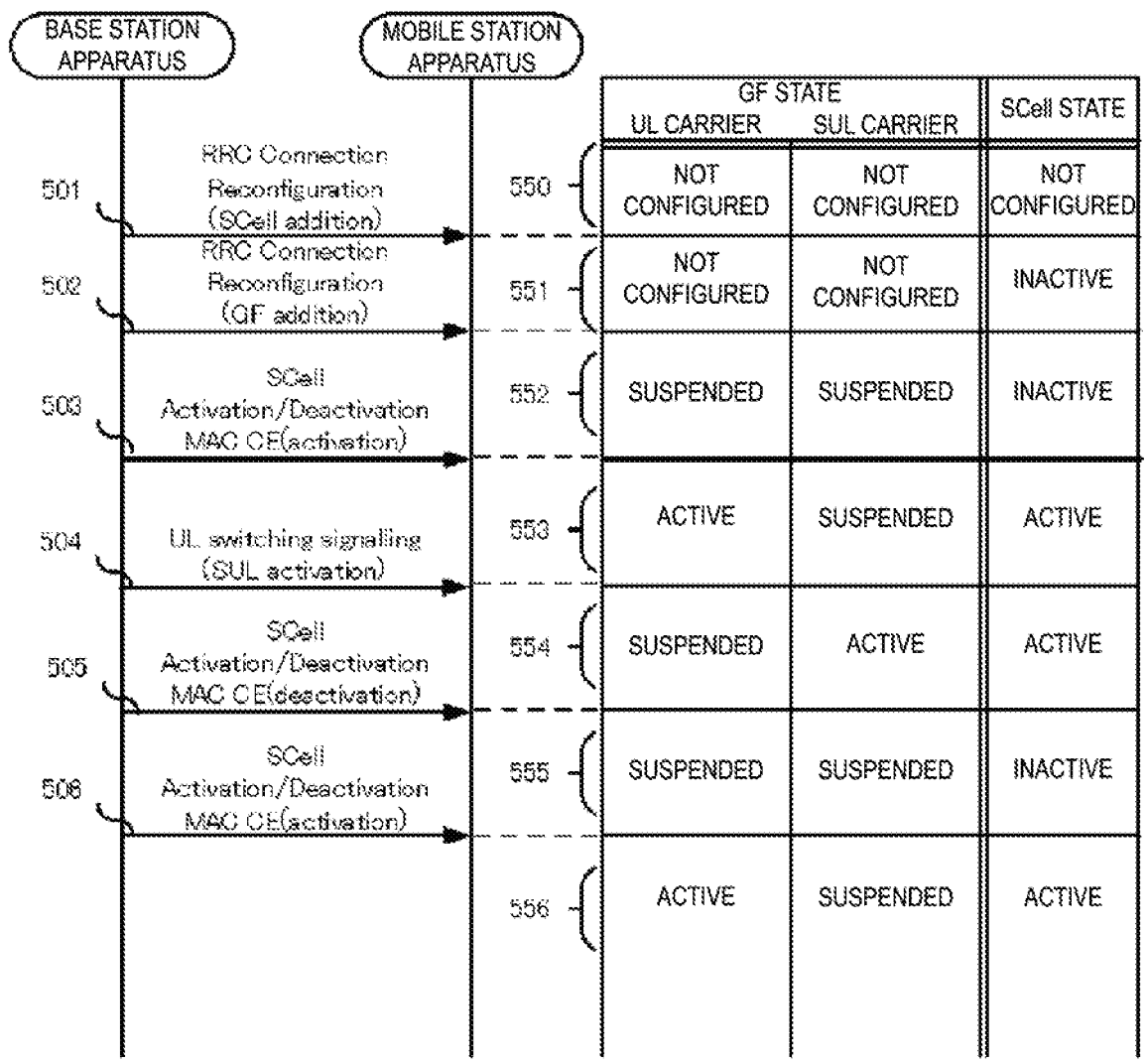
FIG. 5 is a diagram illustrating an example of a flow of messages from the base station apparatus to the mobile station apparatus, states of configured uplink grants of GF for an UL carrier and a SUL carrier, and a state of a serving cell at the time of receiving each of the messages, in a case of employing a third embodiment of the present invention.

With reference to FIG. 5, a description will be given of a method of managing, by a MAC entity of the mobile station apparatus, a state of uplink GF configured for each of an UL carrier and a SUL carrier in a serving cell (SCell), in a case of employing the present embodiment. FIG. 5 illustrates a flow of messages from the base station apparatus to the mobile station apparatus, states of configured uplink grants of GF for the UL carrier and the SUL carrier, and a state of the serving cell in a case of receiving each of the messages. First, in a state where no serving cell is added yet, both the UL carrier and the SUL carrier are in a state where GF is not configured (550). Next, an RRC reconfiguration message 501 indicating addition of a serving cell (SCell) including an UL carrier and a SUL carrier (SCell Addition) is transmitted from the base station apparatus to the mobile station apparatus. The mobile station apparatus that has received the RRC reconfiguration message 501 establishes an uplink physical channel in each of the UL carrier and the SUL carrier in accordance with the contents of the RRC reconfiguration message 501, but GF is not configured yet (551). Next, an RRC reconfiguration message 502 indicating addition of a GF configuration (GF addition) to each of the UL carrier and the SUL carrier is transmitted to the mobile station apparatus. The mobile station apparatus that has received the RRC reconfiguration message 502 configures a configured uplink grant of GF for each of the UL carrier and the SUL carrier in accordance with the contents of the RRC reconfiguration message 502. However, because the serving cell is not activated yet at this time, the configured uplink grant of GF in each of the UL carrier and the SUL carrier is in a suspend state (552). Next, a SCell Activation/Deactivation MAC CE 503 indicating activation of the serving cell (SCell) is transmitted from the base station apparatus to the mobile station apparatus. The mobile station apparatus that has received the SCell Activation/Deactivation MAC CE 503 activates the serving cell and activates the configured uplink grant of GF for the UL carrier, which is set as a default (553). Subsequently, UL switching signalling 504 indicating activation of the configured uplink grant of GF for the SUL carrier (SUL activation) is transmitted from the base station apparatus to the mobile station apparatus. The mobile station apparatus that has received the UL switching signalling 504 suspends the configured uplink grant of GF for the UL carrier while activating the configured uplink grant of GF for the SUL carrier (554). Subsequently, a SCell Activation/Deactivation MAC CE 505 indicating deactivation of the serving cell (SCell) is transmitted from the base station apparatus to the mobile station apparatus. The mobile station apparatus that has received the SCell Activation/Deactivation MAC CE 505 suspends the configured uplink grant of GF for the SUL carrier (555). Subsequently, a SCell Activation/Deactivation MAC CE 506 indicating activation of the serving cell (SCell) is transmitted from the base station apparatus to the mobile station apparatus. The mobile station apparatus that has received the SCell Activation/Deactivation MAC CE 506 activates the serving cell and activates the configured uplink grant of GF for the UL carrier, which is set as a default (556).

As described above, a description has been given of a case that a configured uplink grant of GF for a UL carrier is set as a default in the present embodiment, but this similarly applies to a case that a configured uplink grant of GF for a SUL carrier is set as a default.

Fourth Embodiment

In the third embodiment, a description has been given of a method of determining in advance which one of a configured uplink grant of GF for a UL carrier and a configured uplink grant of GF for a SUL carrier is set as a default. However, another method is also conceivable in which a configured uplink grant configuration of GF including information regarding which one of configured uplink grants of GF is to be set as a default is transmitted from the base station apparatus to the mobile station apparatus, and the mobile station apparatus determines which one of the configured uplink grants of GF is to be set as a default, in accordance with the configuration. This will be described as a fourth embodiment.

Figure 6:
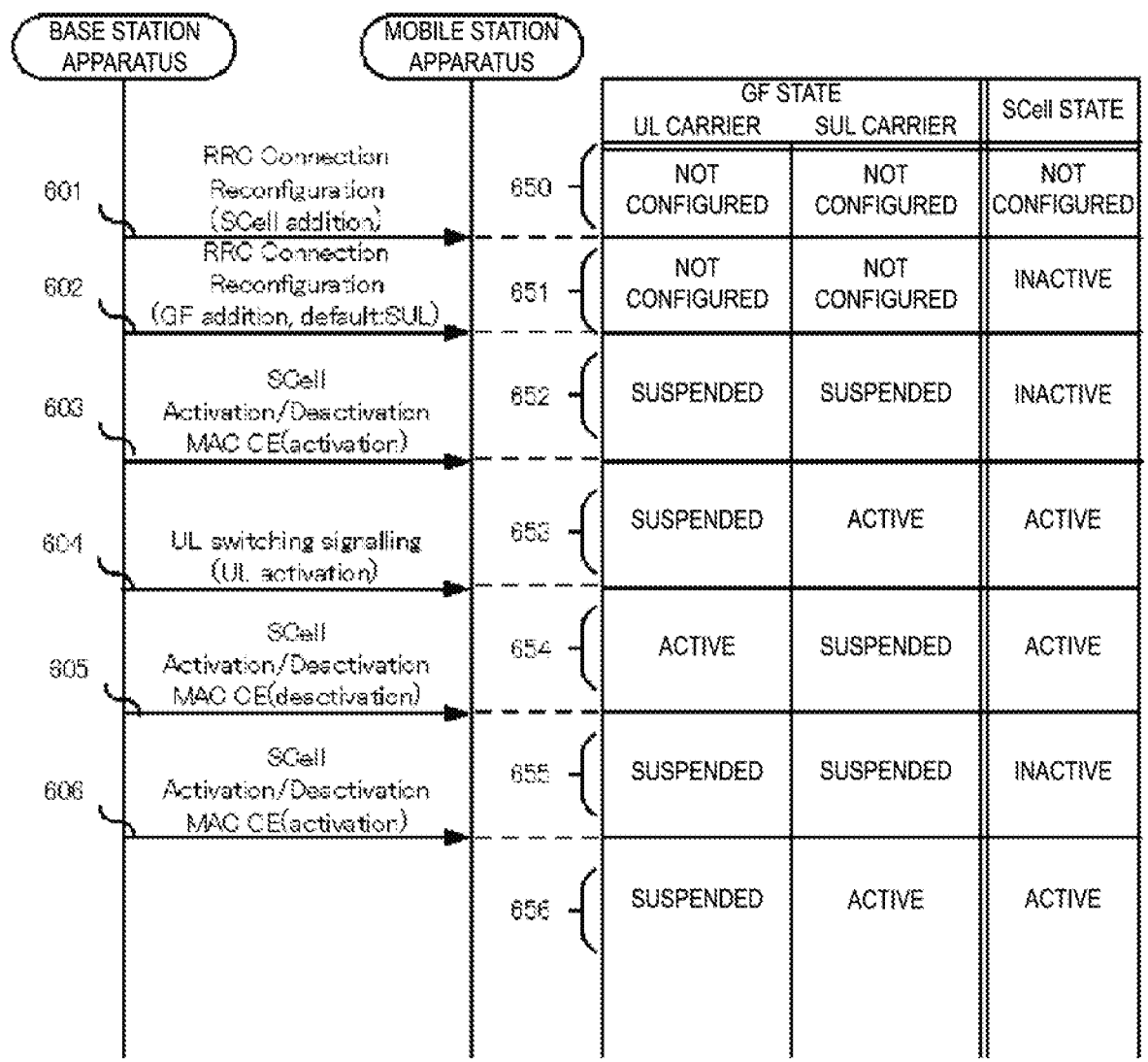
FIG. 6 is a diagram illustrating an example of a flow of messages from the base station apparatus to the mobile station apparatus, states of configured uplink grants of GF for an UL carrier and a SUL carrier, and a state of a serving cell at the time of receiving each of the messages, in a case of employing a fourth embodiment of the present invention.

With reference to FIG. 6, a description will be given of a method of managing, by a MAC entity of the mobile station apparatus, a state of uplink GF configured for each of an UL carrier and a SUL carrier in a serving cell (SCell), in a case of employing the present embodiment. FIG. 6 illustrates a flow of messages from the base station apparatus to the mobile station apparatus, states of configured uplink grants of GF for the UL carrier and the SUL carrier, and a state of the serving cell in a case of receiving each of the messages. First, in a state where no serving cell is added yet, both the UL carrier and the SUL carrier are in a state where GF is not configured (650). Next, an RRC reconfiguration message 601 indicating addition of a serving cell (SCell) including an UL carrier and a SUL carrier (SCell Addition) is transmitted from the base station apparatus to the mobile station apparatus. The mobile station apparatus that has received the RRC reconfiguration message 601 establishes an uplink physical channel in each of the UL carrier and the SUL carrier in accordance with the contents of the RRC reconfiguration message 601, but GF is not configured yet (651). Next, an RRC reconfiguration message 602 indicating addition of a GF configuration (GF addition) to each of the UL carrier and the SUL carrier and setting of the configured uplink grant of GF for the SUL carrier as a default is transmitted to the mobile station apparatus. The mobile station apparatus that has received the RRC reconfiguration message 602 configures a configured uplink grant of GF for each of the UL carrier and the SUL carrier according to the contents of the RRC reconfiguration message 602. However, because the serving cell is not activated yet at this time, the configured uplink grant of GF in each of the UL carrier and the SUL carrier is in a suspend state (652). Next, a SCell Activation/Deactivation MAC CE 603 indicating activation of the serving cell (SCell) is transmitted from the base station apparatus to the mobile station apparatus. The mobile station apparatus that has received the SCell Activation/Deactivation MAC CE 603 activates the serving cell and activates the configured uplink grant of GF for the SUL carrier, which is set as a default (653). Subsequently, UL switching signalling 604 indicating activation of the configured uplink grant of GF for the UL carrier (UL activation) is transmitted from the base station apparatus to the mobile station apparatus. The mobile station apparatus that has received the UL switching signalling 604 suspends the configured uplink grant of GF for the SUL carrier while activating the configured uplink grant of GF for the UL carrier (654). Subsequently, a SCell Activation/Deactivation MAC CE 605 indicating deactivation of the serving cell (SCell) is transmitted from the base station apparatus to the mobile station apparatus. The mobile station apparatus that has received the SCell Activation/Deactivation MAC CE 605 suspends the configured uplink grant of GF for the UL carrier (655). Subsequently, a SCell Activation/Deactivation MAC CE 606 indicating activation of the serving cell (SCell) is transmitted from the base station apparatus to the mobile station apparatus. The mobile station apparatus that has received the SCell Activation/Deactivation MAC CE 606 activates the serving cell and activates the configured uplink grant of GF for the SUL carrier, which is set as a default (656).

As described above, a description has been given of a case that a configuration of setting a configured uplink grant of GF for a SUL carrier as a default is included in an RRC reconfiguration message in the present embodiment, but this similarly applies to a case that a configuration of setting a configured uplink grant of GF for an UL carrier as a default is included in an RRC reconfiguration message.

Fifth Embodiment

In the third and fourth embodiments, descriptions have been given of methods of activating one of a configured uplink grant of GF for an UL carrier and a configured uplink grant of GF for a SUL carrier, the one being set as a default in a case that a serving cell is activated. However, another method is also conceivable in which, in a case that a serving cell being inactive is activated, a configured uplink grant of GF switched from being active to being suspended at the time of deactivation of the serving cell is activated at the time of reactivation of the serving cell. This will be described as a fifth embodiment.

Figure 7:
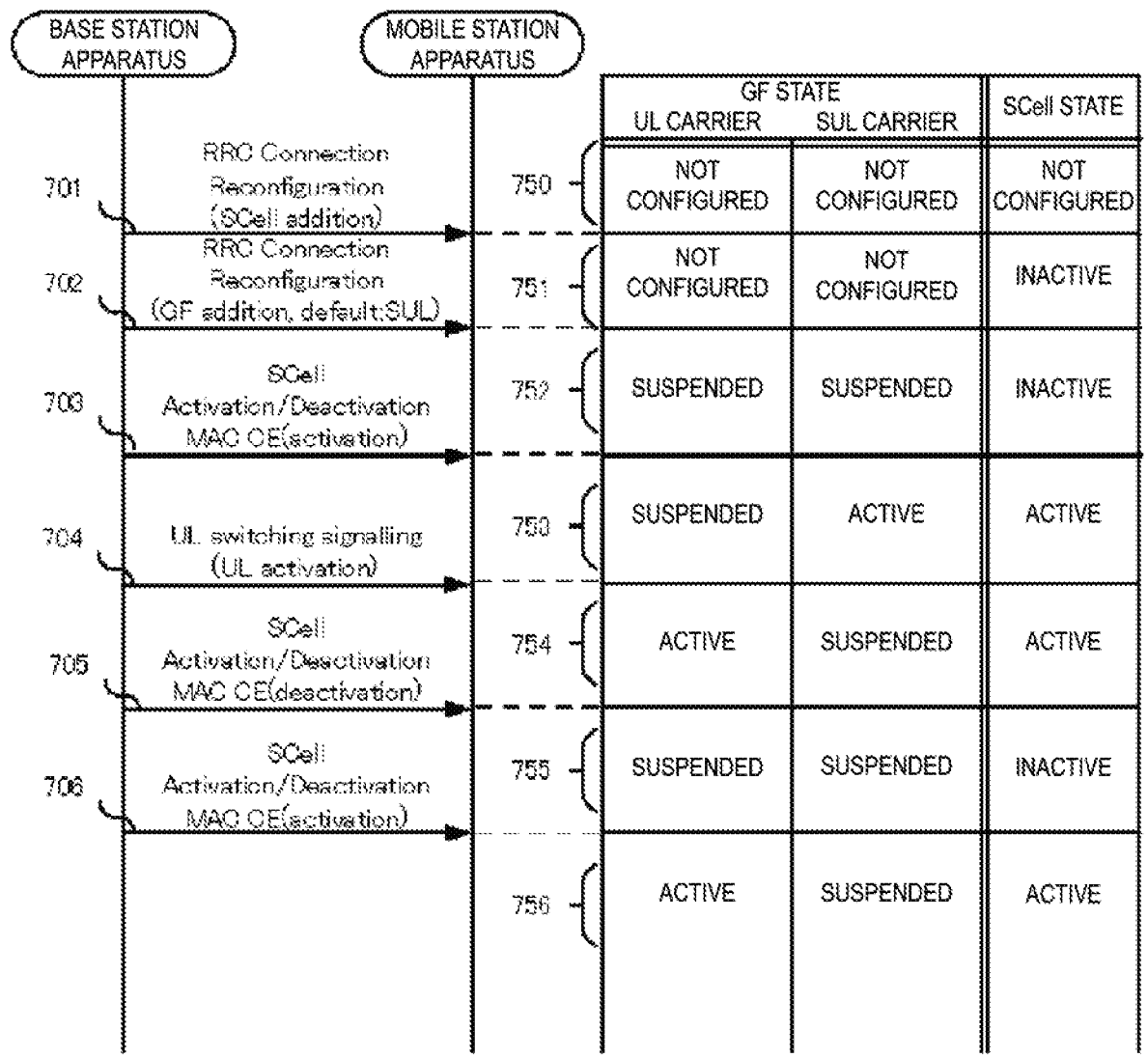
FIG. 7 is a diagram illustrating an example of a flow of messages from the base station apparatus to the mobile station apparatus, states of configured uplink grants of GF for an UL carrier and a SUL carrier, and a state of a serving cell at the time of receiving each of the messages, in a case of employing a fifth embodiment of the present invention.

With reference to FIG. 7, a description will be given of a method of managing, by a MAC entity of the mobile station apparatus, a state of uplink GF configured for each of an UL carrier and a SUL carrier in a serving cell (SCell), in a case of employing the present embodiment. From 701 to 704 and 750 to 754 in FIG. 7 are the same as 601 to 604 and 650 to 654 in FIG. 6 in accordance with the fourth embodiment, and thus descriptions thereof will be omitted. In 754, the configured uplink grant of GF for the UL carrier is active while the configured uplink grant of GF for the SUL carrier is suspended. Next, a SCell Activation/Deactivation MAC CE 705 indicating deactivation of the serving cell (SCell) is transmitted from the base station apparatus to the mobile station apparatus. The mobile station apparatus that has received the SCell Activation/Deactivation MAC CE 705 suspends the configured uplink grant of GF for the UL carrier (755). Subsequently, a SCell Activation/Deactivation MAC CE 706 indicating activation of the serving cell (SCell) is transmitted from the base station apparatus to the mobile station apparatus. The mobile station apparatus that has received the SCell Activation/Deactivation MAC CE 706 activates the serving cell and activates the configured uplink grant of GF for the UL carrier that has been switched from being active in 754 to being suspended in 755 (756).

As described above, a description has been given of a case that a configuration of setting a configured uplink grant of GF for a SUL carrier as a default is included in an RRC reconfiguration message in the present embodiment, but this similarly applies to a case that a configuration of setting a configured uplink grant of GF for an UL carrier as a default is included in an RRC reconfiguration message.

Sixth Embodiment

In standardization of a fifth-generation communication method in 3GPP, a study is underway for introduction of a technology of dividing a single uplink carrier into multiple frequency bands to use, while switching, frequency bands resulting from the division. Each of the frequency bands resulting from the division is referred to as a Bandwidth Part (BWP). An embodiment of the present invention in a case that BWPs are used for an UL carrier and a SUL carrier will be described as a sixth embodiment.

Figure 8:
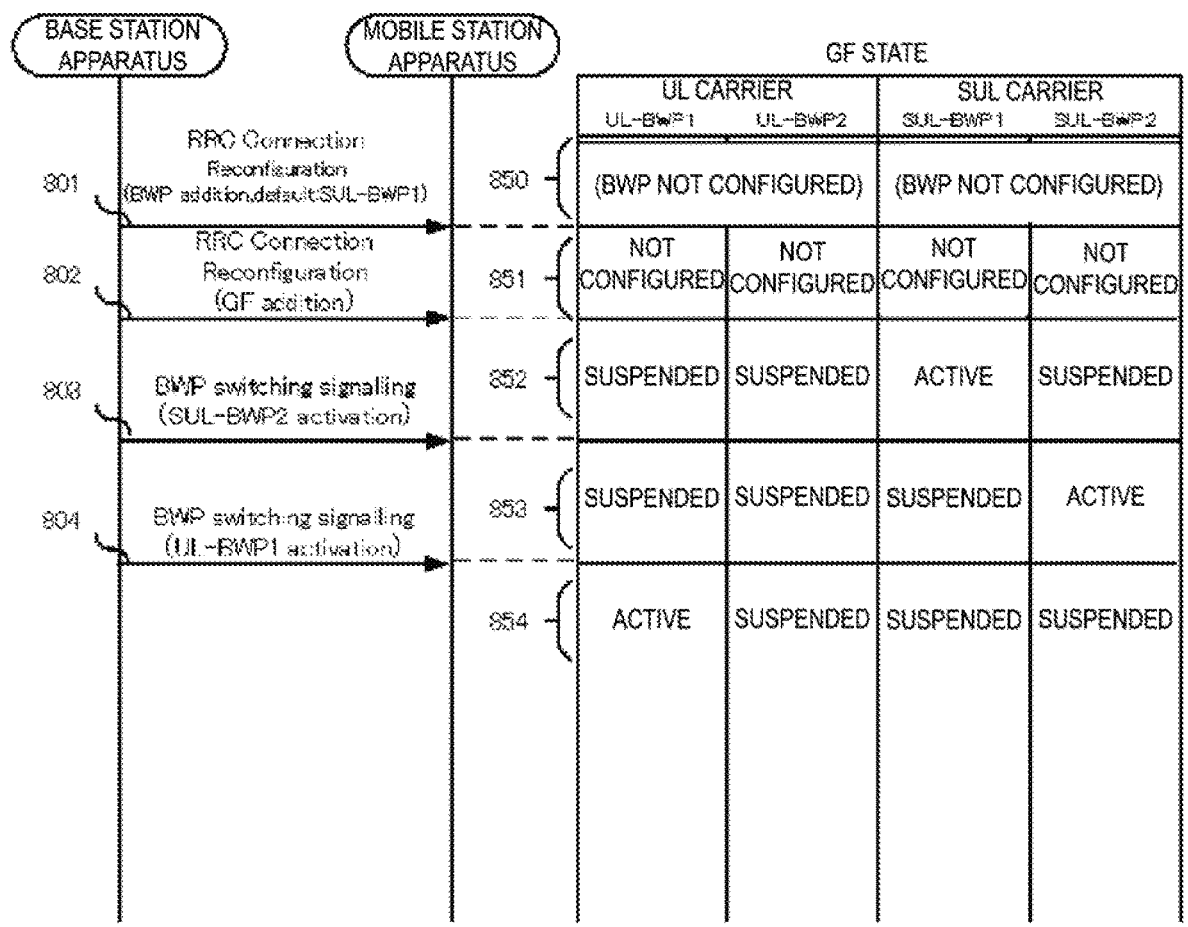
FIG. 8 is a diagram illustrating an example of a flow of messages from the base station apparatus to the mobile station apparatus and states of configured uplink grants of GF in BWPs of an UL carrier and BWPs of a SUL carrier at the time of receiving each of the messages, in a case of employing a sixth embodiment of the present invention.

With reference to FIG. 8, a description will be given of a method of managing, by a MAC entity of the mobile station apparatus, a state of uplink GF configured for each of BWPs of an UL carrier and BWPs of a SUL carrier in a serving cell, in a case of employing the present embodiment. FIG. 8 illustrates a flow of messages from the base station apparatus to the mobile station apparatus in a case that two BWPs are configured for each of the UL carrier and the SUL carrier and states of configured uplink grants of GF for the BWPs of the UL carrier and the BWPs of the SUL carrier in a case of receiving each of the messages. First, in a state where no BWP is configured for the UL carrier and the SUL carrier, both the UL carrier and the SUL carrier are in a state where GF is not configured (850). Next, an RRC reconfiguration message 801 indicating configuration of two BWPs for each of the UL carrier and the SUL carrier and further indicating addition of a BWP configuration including a configuration of setting SUL BWP1 as a default BWP (BWP Addition) is transmitted from the base station apparatus to the mobile station apparatus. Note that a default BWP configuration may be performed individually for the UL carrier and the SUL carrier, or may be performed for the UL carrier and the SUL carrier in common. Although an example of configuring two BWPs for each of the UL carrier and the SUL carrier is illustrated here, the number of BWPs is not limited to two and may be configured to three or more. The number of BWPs may be configured individually or in common for the UL carrier and the SUL carrier. The mobile station apparatus that has received the RRC reconfiguration message 801 configures two BWPs for each of the UL carrier and the SUL carrier in accordance with the contents of the RRC reconfiguration message 801, but GF is not configured yet (851). Next, an RRC reconfiguration message 802 indicating addition of a GF configuration (GF addition) to each of the BWPs of the UL carrier and the SUL carrier is transmitted from the base station apparatus to the mobile station apparatus. The mobile station apparatus that has received the RRC reconfiguration message 802 configures a configured uplink grant of GF for each of the BWPs of the UL carrier and the SUL carrier, in accordance with the contents of the RRC reconfiguration message 802, and activates the configured uplink grant of GF for BWP1 of the SUL carrier, which is configured as a default BWP while suspending the configured uplink grant of GF for each of the other BWPs (852). Next, BWP switching signalling 803 indicating activation of BWP2 of the SUL carrier (SUL-BWP2 activation) is transmitted from the base station apparatus to the mobile station apparatus. For this BWP switching signalling, layer 1 signalling in the downlink, a MAC CE or an RRC message may be used. The mobile station apparatus that has received the BWP switching signalling 803 suspends the configured uplink grant of GF for BWP1 of the SUL carrier while activating the configured uplink grant of GF for BWP2 of the SUL carrier (853). Next, BWP switching signalling 804 indicating activation of BWP1 of the UL carrier (UL-BWP1 activation) is transmitted from the base station apparatus to the mobile station apparatus. The mobile station apparatus that has received the BWP switching signalling 804 suspends the configured uplink grant of GF for BWP2 of the SUL carrier while activating the configured uplink grant of GF for BWP1 of the UL carrier (854).

As described above, a description has been given of a case of including, in an RRC reconfiguration message, a configuration of setting BWP1 of a SUL carrier as a default BWP in the present embodiment, but this similarly applies to a case of including, in an RRC reconfiguration message, a configuration of setting BWP1 or BWP2 of an UL carrier or BWP1 of a SUL carrier as a default BWP.

Although the multiple embodiments of the present invention have been described above, the present invention is not limited to SUL and is also applicable to a case that multiple configured uplink grants are configured in a single serving cell. Although descriptions have been given of GF, the present invention is also applicable to SPS.

Note that a program used for implementing all or some of the functions of the mobile station apparatus and the base station apparatus described above may be recorded on a computer-readable recording medium, and the processing of each unit may be performed by causing a computer system to read and execute the program recorded on the recording medium. Note that the "computer system" here includes an OS and hardware components such as a peripheral device.

Further, the "computer system" includes an environment for supplying a home page (or environment for display a home page) in a case that a WWW system is utilized.

Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium, such as a communication line that is used to transmit the program via a network such as the Internet or via a communication line such as a telephone line, that dynamically retains the program for a short period of time, and a medium, such as a volatile memory within the computer system which functions as a server or a client in that case, that retains the program for a fixed period of time. Furthermore, the above-described program may be one for implementing some of the above-described functions, and also may be one capable of implementing the above-described functions in combination with a program already recorded in a computer system.

Furthermore, all or some of the functions of the mobile station apparatus and the base station apparatus may be implemented by aggregating the functions into an integrated circuit. Each functional block may be individually realized as a chip, or may be partially or completely integrated into a chip. Furthermore, a circuit integration technique is not limited to an LSI, and may be achieved with a dedicated circuit or a general-purpose processor. Furthermore, in a case that with advances in the semiconductor technology, a circuit integration technology with which an LSI is replaced appears, it is also possible to use an integrated circuit based on the technology.

The embodiments of the present invention have been described in detail above with reference to the drawings, but the specific configuration is not limited to the embodiments and includes, for example, a design change that falls within the scope that does not depart from the gist of the present invention.

INDUSTRIAL APPLICABILITY

The present invention is preferable for use in wired and wireless communication systems and communication apparatuses.

The invention claimed is:

1. A mobile station apparatus in a communication system including at least a base station apparatus and the mobile station apparatus for which the base station apparatus allocates a normal uplink and a supplementary uplink in a single serving cell, wherein the mobile station apparatus is configured to:
configure a configured uplink grant individually for each of the normal uplink and the supplementary uplink, and
validate, in a case that the serving cell is activated, one of the configured uplink grant configured for the normal uplink and the configured uplink grant configured for the supplementary uplink and suspend another one.

2. The mobile station apparatus according to claim 1, wherein validating one of the configured uplink grant configured for the normal uplink and the configured uplink grant configured for the supplementary uplink comprises:
in the case that the serving cell is activated, validating the configured uplink grant configured for the normal uplink and suspending the configured uplink grant configured for the supplementary uplink.

3. The mobile station apparatus according to claim 1, wherein validating one of the configured uplink grant configured for the normal uplink and the configured uplink grant configured for the supplementary uplink comprises:
in the case that the serving cell is activated, validating the configured uplink grant configured for the supplementary uplink and suspending the configured uplink grant configured for the normal uplink.

4. The mobile station apparatus according to claim 1, wherein the mobile station apparatus is further configured to:
receive, from the base station apparatus, control information including default uplink information specifying either one of the normal uplink and the supplementary uplink as a default uplink, wherein validating one of the configured uplink grant configured for the normal uplink and the configured uplink grant configured for the supplementary uplink comprises:
in the case that the serving cell is activated, validating the configured uplink grant for the default uplink specified by the default uplink information.

5. The mobile station apparatus according to claim 1, wherein the mobile station apparatus is further configured to:
suspend, in a case that the serving cell is deactivated, the configured uplink grant that was validate; and
validate, in a case that the serving cell is activated again, the configured uplink grant that was suspended due to the serving cell being deactivated.

6. The mobile station apparatus according to claim 1, wherein the mobile station apparatus is further configured to:
receive, from the base station apparatus, uplink switching control information; and
suspend the configured uplink grant that was validated and validate the configured uplink grant that was suspended based on the received uplink switching control information.

* * * * *